US 8,095,656 B2

(12) United States Patent
McCormack

(10) Patent No.: US 8,095,656 B2
(45) Date of Patent: Jan. 10, 2012

(54) GEO-POSITIONALLY BASED DATA ACCESS SECURITY

(75) Inventor: Robert J. McCormack, West Perth (AU)

(73) Assignee: International Business Machines Corportion, Armonk, NY (US)

( * ) Notice: Subject to any disclaimer, the term of this patent is extended or adjusted under 35 U.S.C. 154(b) by 0 days.

(21) Appl. No.: 12/619,011

(22) Filed: Nov. 16, 2009

(65) Prior Publication Data

US 2011/0119379 A1 May 19, 2011

(51) Int. Cl.
*G06F 15/173* (2006.01)
(52) U.S. Cl. ............... 709/225; 709/229; 726/4; 726/27
(58) Field of Classification Search .......... 709/224–225, 709/229; 726/2, 4, 27
See application file for complete search history.

(56) References Cited

U.S. PATENT DOCUMENTS

| | | | |
|---|---|---|---|
| 5,754,657 A | 5/1998 | Schipper et al. | |
| 6,978,376 B2 * | 12/2005 | Giroux et al. | 713/189 |
| 6,983,313 B1 * | 1/2006 | Korkea-Aho | 709/219 |
| 7,093,131 B1 | 8/2006 | Kobayashi | |
| 7,177,426 B1 | 2/2007 | Dube | |
| 7,233,942 B2 * | 6/2007 | Nye | 707/999.01 |
| 2002/0169869 A1 | 11/2002 | Fainer et al. | |
| 2003/0140288 A1 * | 7/2003 | Loaiza et al. | 714/718 |
| 2004/0111640 A1 * | 6/2004 | Baum | 713/201 |
| 2004/0242240 A1 * | 12/2004 | Lin | 455/456.3 |
| 2007/0288157 A1 * | 12/2007 | Peterman | 701/207 |
| 2008/0022003 A1 * | 1/2008 | Alve | 709/229 |
| 2008/0289033 A1 * | 11/2008 | Hamilton et al. | 726/19 |
| 2008/0316042 A1 * | 12/2008 | Scales | 340/686.1 |
| 2009/0070290 A1 * | 3/2009 | Nye | 707/2 |
| 2009/0138360 A1 * | 5/2009 | Choti et al. | 705/14 |
| 2009/0320037 A1 * | 12/2009 | Gokhale et al. | 718/104 |
| 2010/0205316 A1 * | 8/2010 | Xue et al. | 709/229 |
| 2010/0325046 A1 * | 12/2010 | Milne | 705/44 |
| 2011/0208702 A1 * | 8/2011 | Minde et al. | 707/687 |

FOREIGN PATENT DOCUMENTS

WO 2008058123 A2 5/2008

* cited by examiner

*Primary Examiner* — Oanh Duong
(74) *Attorney, Agent, or Firm* — Cantor Colburn LLP; Steven Chiu

(57) ABSTRACT

Methods, systems, and computer program products for implementing geo-positionally based data access security is provided. A method includes receiving a request at a computer to verify a geographic location of a segment of data stored in a storage device. The method further includes receiving, at the computer, an actual geographic location of the storage device from a geographic location device connected to the storage device. The method additionally includes accessing, at the computer, a location tag including an expected geographic location of the segment of data, and comparing, at the computer, the expected geographic location to the actual geographic location. The method also includes returning a value indicating that an error has occurred when the comparing indicates that the expected geographic location does not match the actual geographic location.

20 Claims, 4 Drawing Sheets

GEO-POSITIONALLY BASED DATA ACCESS SECURITY

BACKGROUND

This invention relates generally to processing within a computing environment, and more particularly to geo-positionally based data access security systems.

Controlling access to protected resources is of paramount importance in many computing environments. Inadvertent or unauthorized access to a protected resource can corrupt the resource and have other detrimental effects on the computing environment. In general, access is controlled by limiting for a given resource those processes authorized to access the resource. Data access security is a means of ensuring that data is kept safe from corruption and that access to it is suitably controlled. In contemporary computer systems, access to certain defined information is controlled by software security systems. These systems may use encryption, or access polices to protect access to files. In some cases, government agencies or corporate entities issue directives that certain classes of information be located in a specific geographic location. These organizations may have mandated audit controls to prove compliance with the geographic location requirement.

SUMMARY

An exemplary embodiment is a method for implementing geo-positionally based data access security. The method includes receiving a request at a computer to verify a geographic location of a segment of data stored in a storage device. The method further includes receiving, at the computer, an actual geographic location of the storage device from a geographic location device connected to the storage device. The method additionally includes accessing, at the computer, a location tag including an expected geographic location of the segment of data, and comparing, at the computer, the expected geographic location to the actual geographic location. The method also includes returning a value indicating that an error has occurred when the comparing indicates that the expected geographic location does not match the actual geographic location.

Another exemplary embodiment is a system for implementing geo-positionally based data access security. The system includes a computer and a geo-positionally based data access security system executable by the computer, the system capable of performing a method. The method includes receiving a request at a computer to verify a geographic location of a segment of data stored in a storage device. The method further includes receiving, at the computer, an actual geographic location of the storage device from a geographic location device connected to the storage device. The method additionally includes accessing, at the computer, a location tag including an expected geographic location of the segment of data, and comparing, at the computer, the expected geographic location to the actual geographic location. The method also includes returning a value indicating that an error has occurred when the comparing indicates that the expected geographic location does not match the actual geographic location.

A further exemplary embodiment is a computer program product for implementing geo-positionally based data access security. The computer program product includes a tangible storage medium for storing instructions. The tangible storage medium readable by a processing circuit, the processing circuit performing a method. The method includes receiving a request at a computer to verify a geographic location of a segment of data stored in a storage device. The method further includes receiving, at the computer, an actual geographic location of the storage device from a geographic location device connected to the storage device. The method additionally includes accessing, at the computer, a location tag including an expected geographic location of the segment of data, and comparing, at the computer, the expected geographic location to the actual geographic location. The method also includes returning a value indicating that an error has occurred when the comparing indicates that the expected geographic location does not match the actual geographic location.

Other systems, methods, apparatuses, and/or design structures according to embodiments will be or become apparent to one with skill in the art upon review of the following drawings and detailed description. It is intended that all such additional systems, methods, apparatuses, and/or design structures be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides for geo-positionally based data access security.

Some governmental agencies and corporate entities require protection of data beyond mere encryption. For example, some government agencies may mandate that data be located in a particular geographic location. Current technologies allow for automated encryption of data, however current mechanisms for ensuring data is located in a specific location may require manual audits which can be time consuming, expensive, and do not allow for real time instantaneous verification of the location of the data.

Exemplary embodiments of the geo-positionally based data access security system described herein are directed to storing information that is secured both by encryption and through confirmation of the data's geographic location. The system compares the location of the data with coordinates that are stored with the data to ensure that the data is properly located geographically before allowing access to the data. In this way, the data is ensured to be accessible only when it is in the area in which it is required to be located. An automated mechanism for providing periodic instantaneous audits of the data's current location is also provided.

Figure 1:
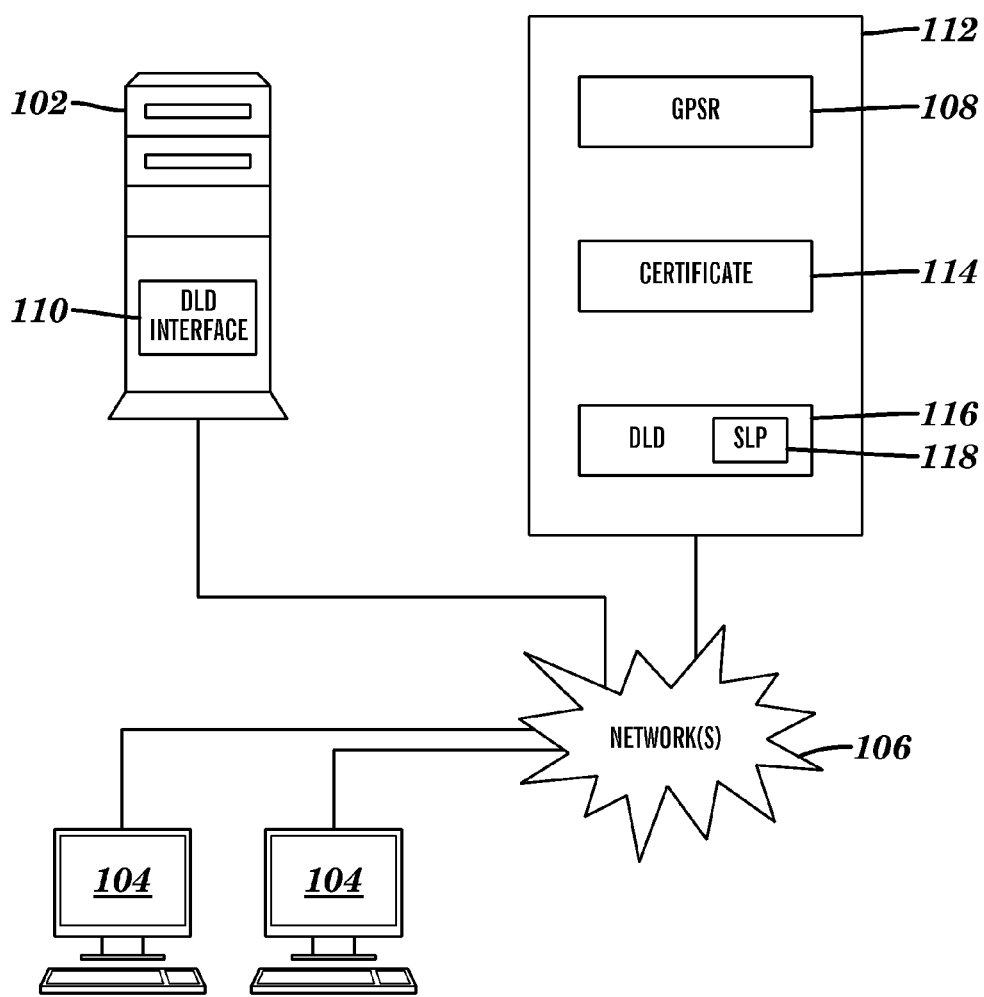
FIG. 1 depicts a block diagram of a data processing system that may be implemented by an exemplary embodiment of a geo-positionally based data access security system.

Turning now to FIG. 1, a system 100 for implementing geo-positionally based data access security will now be described. In an exemplary embodiment, the system 100 includes a host system 102 executing computer instructions for geo-positionally based data access security. The host system 102 may operate in any type of environment that is capable of executing a software application. The host system 102 may comprise a high-speed computer processing device, such as a mainframe computer, to manage the volume of operations governed by an entity for which the geo-positionally based data access security is executing. In an exemplary embodiment, the host system 102 is part of an enterprise (e.g., a commercial business) that implements the geo-positionally based data access security.

In an exemplary embodiment, the system 100 depicted in FIG. 1 includes one or more client systems 104 through which users at one or more geographic locations may contact the host system 102. The host system 102 contains a defined location data (DLD) interface 110. The DLD interface 110 is used in conjunction with the other components of the storage device to access the data stored on a storage device 112 as will be discussed more fully below. In alternative embodiments, the DLD interface 110 is located on the storage device 112 or on one of the client systems 104. The client systems 104 are coupled to the host system 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system 102 (e.g., by providing an applet to the client system 104). Client systems 104 may be operated by authorized users (e.g., system administrators, auditors) of the geo-positionally based data access security described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system 102 through multiple networks (e.g., intranet and Internet) so that not all client systems 104 are coupled to the host system 102 through the same network. One or more of the client systems 104 and the host system 102 may be connected to the networks 106 in a wireless fashion. In one embodiment, the networks include an intranet and one or more client systems 104 execute a user interface application (e.g., a web browser) to contact the host system 102 through the networks 106. In another exemplary embodiment, the client system 104 is connected directly (i.e., not through the networks 106) to the host system 102 and the host system 102 contains memory for storing data in support of geo-positionally based data access security. Alternatively, a separate storage device (e.g., storage device 112) may be implemented for this purpose.

The geo-positionally based data access security storage device 112 includes a data repository with data relating to geo-positionally based data access security by the system 100, as well as other data/information desired by the entity representing the host system 102 of FIG. 1. The storage device 112 is logically addressable as a consolidated data source across a distributed environment that includes networks 106. The storage device 112 can be configured as a storage area network (SAN) or any other data access and storage device. Information stored in the storage device 112 may be retrieved and manipulated via the host system 102 and/or the client systems 104. The term "SAN" is used herein as an example of a storage device 112 that may be implemented by an exemplary embodiment. The storage device 112 stores one or more databases containing, e.g., geo-positionally based data access security and corresponding configuration parameters, values, methods, and properties, as well as other related information. It will be understood by those of ordinary skill in the art that the storage device 112 may also comprise other structures, such as an XML file on the file system or distributed over a network (e.g., one of networks 106), or from a data stream from another server located on a network. In addition, the storage device 112 may alternatively be located on a client system 104.

As depicted in FIG. 1, the storage device 112 contains a geographic location device, shown in FIG. 1 as a global positioning system receiver (GPSR) 108 positioned in an anti-tamper mounting. Other geographic location devices that may implemented by exemplary embodiments include, but are not limited to the Chinese Compass navigation system, the Russion Federation's GLONASS and European Union's GALILEO global positioning satellite navigation systems. In an exemplary embodiment, the GPSR 108 is physically connected to the storage device 112 as a GPSR card. In an alternate exemplary embodiment the GPSR 108 is connected to the storage device 112 internally, that is the GPSR 108 is incorporated in the storage device hardware directly. In an exemplary embodiment, the GPSR 108 is integrated into the hard disk, or other data storage drive or device circuitry of the storage device 112 directly. The GPSR 108 is used to detect the physical location of the storage device 112 as will be described more fully below. It will be understood by those skilled in the art that the GPSR 108 can be used in conjunction with an internal or external antenna or other signal booster to increase the detection strength of the GPSR 108.

In addition, the storage device 112 depicted in FIG. 1 contains an encryption certificate 114. The certificate 114 is used for authentication and encryption. In an exemplary embodiment, the certificate 114 is an X.509 compliant certificate that contains additional extended attributes such as the unique serial number of the GPSR 108 as will be described in more detail below. The storage device 112 also contains data that is to be protected. This data is referred to referred to herein as defined location data (DLD) 116 and stored as a plurality of segments of data. The DLD 116 is encrypted and stored on the storage device 112. The DLD 116 can be any type of data including, but not limited to: all or a portion of a text file, a multimedia file, a database, and a database table. In alternate embodiments the DLD 116 is a combination of all of these types of data, and/or refers to the contents of an entire disk volume. Associated with the DLD 116 is a specific location position (SLP) tag 118 (also referred to herein as a location tag"). The SLP tag 118 contains information relevant to the required geographic location of the data as will be described more fully below.

The host system 102 depicted in the system of FIG. 1 may be implemented using one or more servers operating in response to a computer program stored in a storage medium accessible by the server. The host system 102 may operate as a network server (e.g., a web server) to communicate with the client systems 104. The host system 102 handles sending and receiving information to and from the client systems 104 and can perform associated tasks. The host system 102 may also include a firewall to prevent unauthorized access to the host system 102 and enforce any limitations on authorized access. For instance, an administrator may have access to the entire system and have authority to modify portions of the system. A firewall may be implemented using conventional hardware and/or software as is known in the art.

The host system 102 may also operate as an application server. The host system 102 executes one or more computer programs to provide geo-positionally based data access security.

As indicated above, processing may be shared by the client systems 104 and the host system 102 by providing an application (e.g., java applet) to the client systems 104. Alternatively, the client system 104 can include a stand-alone software application for performing a portion of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the geo-positionally based data access security system described in FIG. 1 may be implemented in hardware, software, or a combination thereof.

Figure 2:
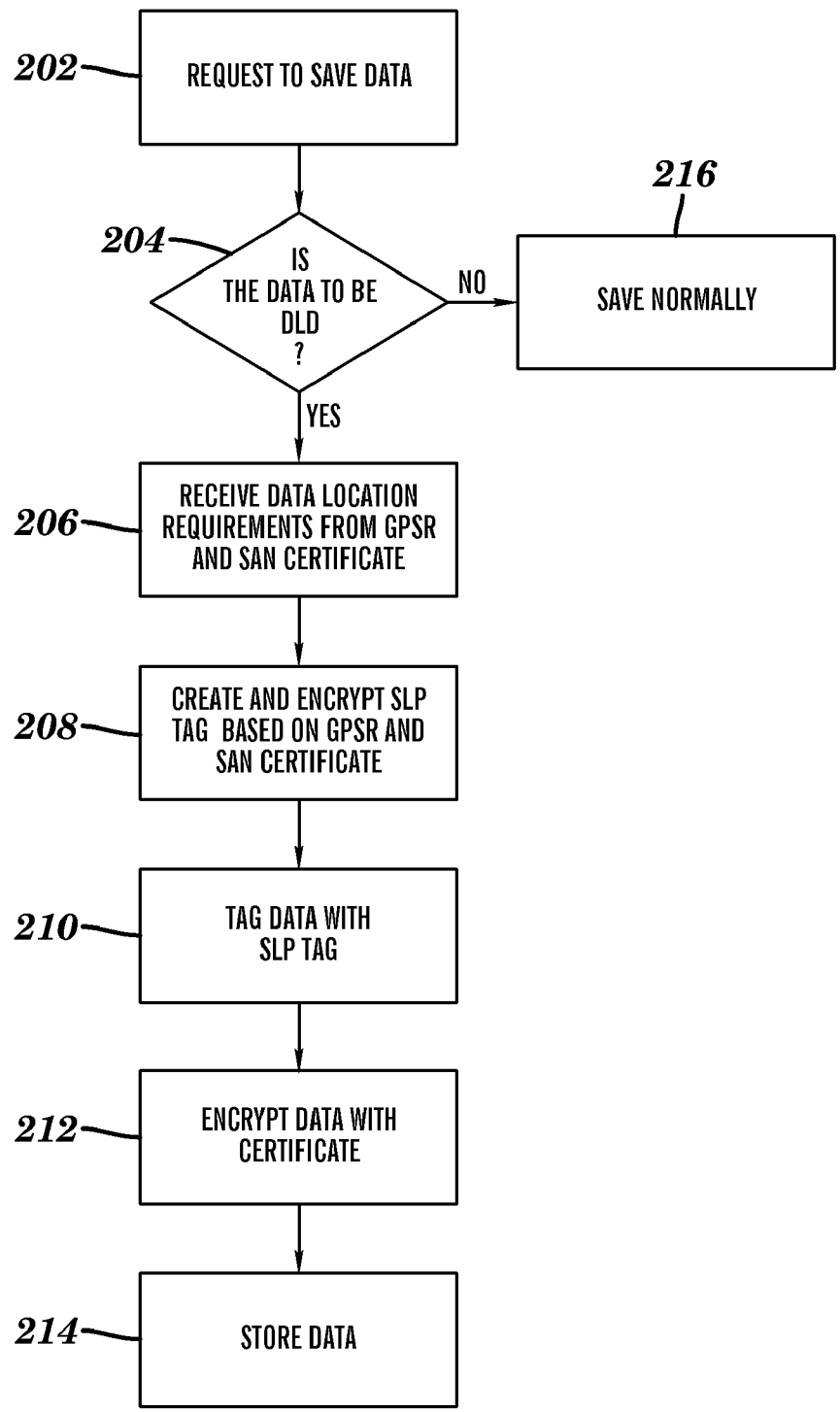
FIG. 2 depicts an exemplary embodiment of a process flow that may be implemented to store data within the geo-positionally based data access security system.

FIG. 2 depicts an exemplary embodiment of a process flow that may be used to store data within the geo-positionally based data access security system 100. In an exemplary embodiment, the process depicted in FIG. 2 is facilitated by the DLD interface 110 executing at the host system 102. At block 202, the DLD interface 110 (implemented, for example, by an application programming interface or "API") receives a request to store data. The request contains the data segment that is to be stored. At block 204, the request is inspected to ensure that the data to be stored is DLD data 116. In an exemplary embodiment, the request is flagged as pertaining to DLD data 116 by the use of an indicator such as, but not limited to: a particular parameter in the request, a special data wrapper and/or by inspecting the data element itself based on a filtering algorithm. If the data segment is determined to be non-DLD data (i.e. regular data), then the data is stored at block 216 in the typical fashion without the use of geographic information.

Otherwise, if the data is determined to be DLD data 116 at block 204, then block 206 is performed and the DLD interface 110 forwards the request to the storage device 112. The storage device receives the request and the data segment along with instructions indicating the geographic location where the data must be stored based on the certificate 114 and the GPSR 108 connected to the storage device 112. The geographic location can be, for example, global positioning satellite (GPS) coordinates or the location's longitude and latitude, or any other indication of the geographic location known in the art. In an alternative embodiment, the GPS coordinates (an example of a geographic location) are also sent to the storage device 112 within the request itself.

At block 208, the storage device 112 uses the GPS coordinates to create an SLP tag 118. In an exemplary embodiment, the SLP tag 118 is a data element that includes the unique serial number of the GPSR 108, the latitude of the DLD 116, the longitude of the DLD 116, the height above sea level of the DLD 116, and the area value of the DLD 116. The area value is a set of adjustment factors to the latitude, longitude, and height, which is used to create an area that would cover the area deemed to be the "specific geographic location." These adjustment factors allow a plus or minus of the longitude, latitude, and altitude that can be used to specify the bounding area in which the storage device 112 will be contained in. In an alternative embodiment, more than one adjustment factor is associated to each of the longitude, latitude, and altitude requirements of the DLD 116 to allow for higher fidelity of adjustment.

At block 210 in FIG. 2, the SLP tag 118 is associated with the segment of data (i.e., the DLD 116). In an exemplary embodiment, the SLP tag 118 is associated to the DLD 116 by embedding it within the DLD 116, attaching it directly to the front or back of the DLD 116, or by placing it in a specified location apart from the DLD 116. At block 212, the data, and optionally the SLP tag, are encrypted. The encryption can be any form of encryption known in the art. In an exemplary embodiment, the data segment is encrypted using the encryption certificate 114. Once all of the data has been encrypted, the encrypted data is stored on the storage device 112 at block 214.

Figure 3:
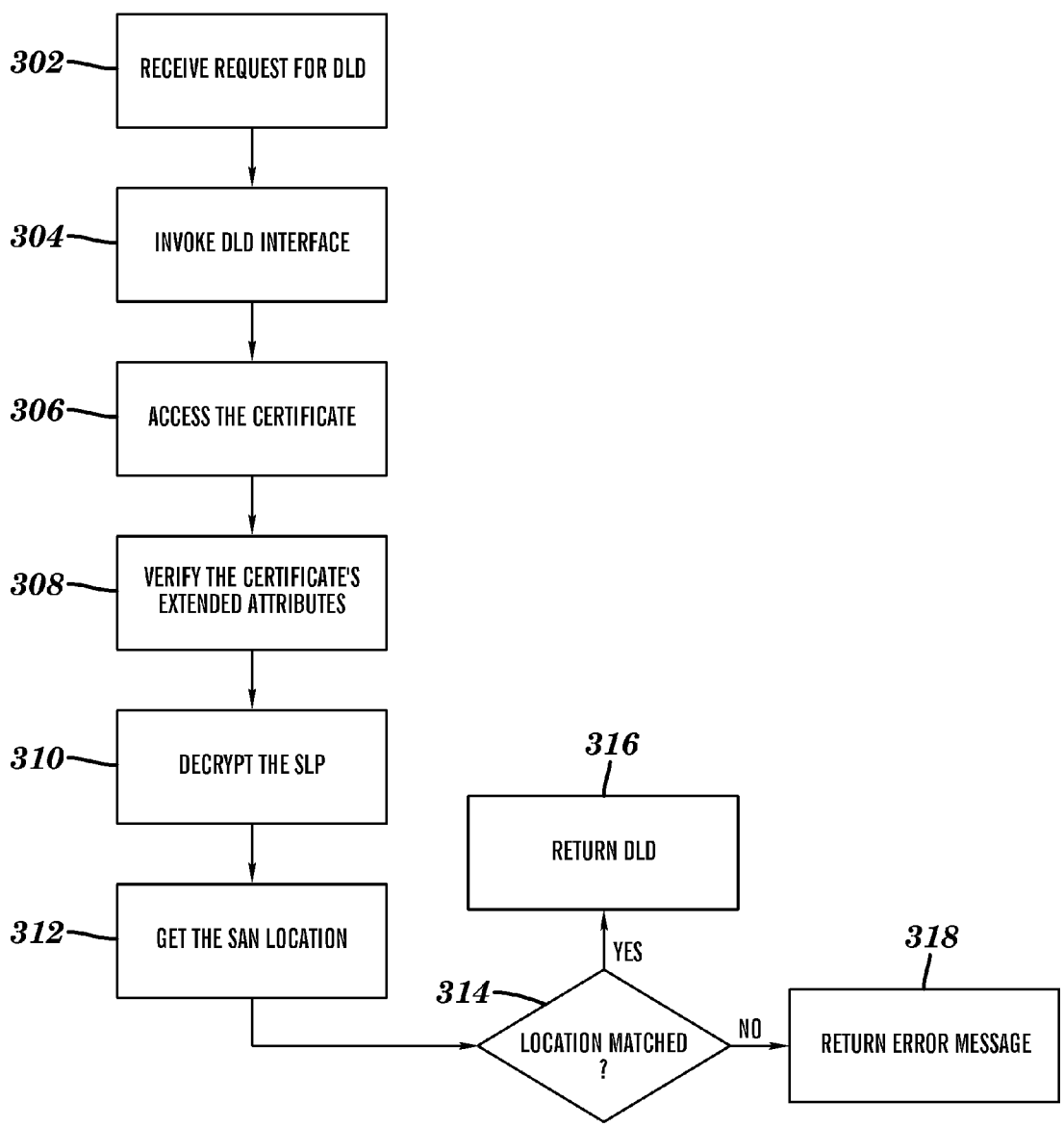
FIG. 3 depicts an exemplary embodiment of a process flow that may be implemented to retrieve data within the geo-positionally based data access security system.

FIG. 3 depicts an exemplary embodiment of a process flow that may be used to retrieve data within the geo-positionally based data access security system 100. In an exemplary embodiment, the process depicted in FIG. 3 is facilitated by the DLD interface 110 executing at the host system 102. At block 302, a request for DLD data is received by the DLD interface 110 and at block 304 the DLD interface 110 is invoked to handle the request. At block 306, the DLD interface retrieves an encryption certificate 114 and extracts an expected serial number (or expected identifier) from the extended attributes of the certificate 114. At block 308 the DLD interface 110 compares the expected serial number that was extracted from the certificate at block 306 and compares that to the unique serial number of the GPSR 108 connected to the storage device 112. If they match, then the DLD interface decrypts the SLP tag 118 associated to the requested DLD 116 (also referred to herein as a data segment) at block 310.

At block 312, the DLD interface 110 requests the current GPS coordinates from the GPSR 108. At step 314, the DLD interface 110 compares the values of the SLP tag 118 to the current GPS coordinates of the storage device 112 and verifies that the storage device 112 is in the geographic area that is specified in the SLP tag 118. In exemplary embodiments the DLD interface 110 verifies the coordinates by comparing the longitude, latitude, and altitude of the SAN to the longitude, latitude, and altitude of the SLP tag 118 plus or minus the adjustment factors, which may also be contained in the SLP tag 118. It will be understood that other mechanisms for comparing the geographic location data may also be used.

If the DLD interface 110 determines that the storage device 112 is in the geographic location specified in the SLP tag 118, at block 316 the DLD interface 110 decrypts and returns the DLD 116. In alternative embodiments the DLD 116 is returned in its encrypted form for decryption at a later time. If at block 314, the DLD interface 110 determines that storage device 112 is not in the location specified in the SLP tag 118, the DLD interface 110 may return an error message to the requestor. In alternative embodiments, the DLD interface 110 exits silently without returning an error.

Figure 4:
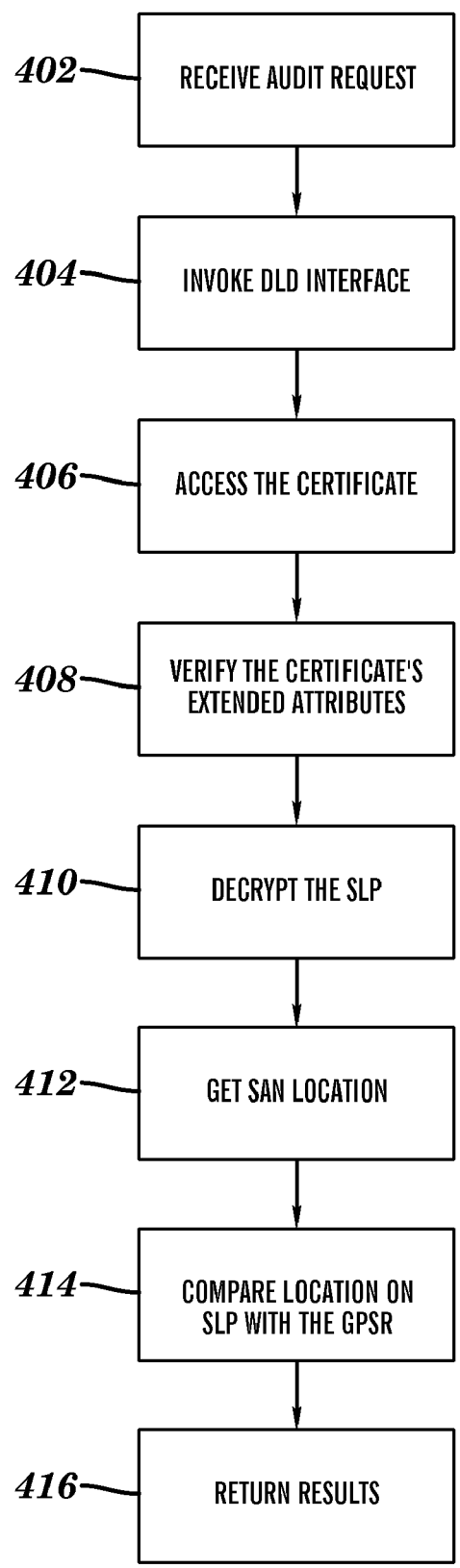
FIG. 4 depicts an exemplary embodiment of a process flow that that may be implemented to audit data within the geo-positionally based data access security system.

FIG. 4 depicts an exemplary embodiment of a process flow that may be used to retrieve data within the geo-positionally based data access security system 100. In an exemplary embodiment, the process depicted in FIG. 4 is facilitated by the DLD interface 110 executing at the host system 102. At block 402, an audit request is received. At block 404, the DLD interface 110 is invoked to handle processing the audit request. At block 406, the DLD interface 110 retrieves the encryption certificate 114 and extracts the expected GPSR serial number from the extended attributes of the certificate 114. At block 408, the DLD interface 110 compares the expected GPSR serial number that was extracted from the certificate 114 at block 406 to actual serial number of the GPSR 108 that is connected to the storage device 112. If the serial numbers match, then the DLD interface 110 decrypts the SLP tag 118 associated with the requested DLD 116 at block 410. At block 412, the DLD interface 110 requests the current GPS coordinates from the GPSR 108. At step 414, the DLD interface 110 compares the values of the SLP tag 118 to the current GPS coordinates of the storage device 112 and verifies that the storage device 112 is in the area that is specified in the SLP tag 118 using the methods described above. At block 416, the DLD interface 110 returns the results of the comparison completed at step 414 to the requestor.

Although the DLD interface 110 has been described as using the host system 102 for the processing, it will be understood that all or a portion of the processing could be completed on the client system 104 or the storage device 112, or any combination of thereof. In addition, the term storage device 112 may refer to multiple storage devices contained in a SAN.

Technical effects and benefits the ability to store information that is secured both by encryption and through confirmation of the data's geographic location. The system compares the location of the data with coordinates that are stored with the data to ensure that the data is properly located geographically before allowing access to the data. In this manner, the data is ensured to be accessible only when it is in the area in which it is required to be located. An automated mechanism for providing periodic instantaneous audits of the data's current location is also provided.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product as depicted in on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for implementing geo-positionally based data access security, the method comprising:
   receiving a request at a computer to verify a geographic location of a segment of data stored in a storage device;
   receiving, at the computer, an actual geographic location of the storage device from a geographic location device connected to the storage device;
   accessing, at the computer, a location tag including an expected geographic location of the segment of data, the expected geographic location of the segment of data comprising a geographic location of the storage device at the time that the location tag was created;
   comparing, at the computer, the expected geographic location to the actual geographic location; and
   returning a value indicating that an error has occurred when the comparing indicates that the expected geographic location does not match the actual geographic location.

2. The method of claim 1, further comprising verifying that the geographic location device connected to the storage device is an expected geographic location device, the verifying comprising:
   accessing an expected identifier of the geographic location device; and
   comparing the expected identifier to a unique serial number of the storage device, wherein the verifying is successful when the expected identifier is equal to the unique serial number.

3. The method of claim 2, wherein the expected identifier of the geographic location device is located in an extended attribute of a certificate associated with the storage device and wherein the verifying further comprises determining that the certificate is valid.

4. The method of claim 1, wherein the receiving is in response to a request to retrieve the segment of data.

5. The method of claim 4, wherein the comparing indicates that the expected geographic location matches the actual geographic location and the method further comprises returning the segment of data.

6. The method of claim 1, wherein the receiving is in response to a request to audit a location.

7. The method of claim 6, wherein the comparing indicates that the expected geographic location matches the actual geographic location and the method further comprises returning the actual location.

8. The method of claim 1, further comprising storing a new data segment, the storing comprising:
   receiving a request to store the new segment of data at the actual geographic location of the storage device;
   creating a new location tag, the new location tag including the actual geographic location of the storage device;
   associating the new location tag to the new segment of data; and
   storing the new segment of data and the new location tag on the storage device.

9. A system for implementing geo-positionally based data access security comprising:
   a computer; and
   a geo-positionally based data access security system executable by the computer, the geo-positionally based data access security system capable of performing a method comprising:
      receiving a request to verify a geographic location of a segment of data stored in a storage device;
      receiving an actual geographic location of the storage device from a geographic location device connected to the storage device;
      accessing a location tag including an expected geographic location of the segment of data, the expected geographic location of the segment of data comprising a geographic location of the storage device at the time that the location tag was created;
      comparing the expected geographic location to the actual geographic location; and returning a value indicating that an error has occurred when the comparing indicates that the expected geographic location does not match the actual geographic location.

10. The system of claim 9, wherein the method further comprises verifying that the geographic location device connected to the storage device is an expected geographic location device, the verifying comprising:
   accessing an expected identifier of the geographic location device; and
   comparing the expected identifier to an unique serial number of the storage device, wherein the verifying is successful when the expected identifier is equal to the unique serial number.

11. The system of claim 9, wherein the receiving is in response to a request to retrieve the segment of data.

12. The system of claim 9, wherein the comparing indicates that the expected geographic location matches the actual geographic location and the method further comprises returning the segment of data.

13. The system of claim 9, wherein the receiving is in response to a request to audit a location.

14. The system of claim 13, wherein the comparing indicates that the expected geographic location matches the actual geographic location and the method further comprises returning the actual location.

15. The system of claim 9, wherein the method further comprises storing a new data segment, the storing comprising:
   receiving a request to store the new segment of data at the actual geographic location of the storage device;
   creating a new location tag, the new location tag including the actual geographic location of the storage device;
   associating the new location tag to the new segment of data; and
   storing the new segment of data and the new location tag on the storage device.

16. A computer program product for implementing geopositionally based data access security, the computer program product comprising:
   a non-transitory storage medium readable by a processing circuit and storing instructions for execution by the processing circuit for performing a method comprising:
      receiving a request to verify a geographic location of a segment of data stored in a storage device;
      receiving an actual geographic location of the storage device from a geographic location device connected to the storage device;
      accessing a location tag including an expected geographic location of the segment of data, the expected geographic location of the segment of data comprising a geographic location of the storage device at the time that the location tag was created;
      comparing the expected geographic location to the actual geographic location; and
      returning a value indicating that an error has occurred when the comparing indicates that the expected geographic location does not match the actual geographic location.

17. The computer program product of claim 16, wherein the method further comprises verifying that the geographic location device connected to the storage device is an expected geographic location device, the verifying comprising:
   accessing an expected identifier of the geographic location device; and
   comparing the expected identifier to an unique serial number of the storage device, wherein the verifying is successful when the expected identifier is equal to the unique serial number.

18. The computer program product of claim 16, wherein the receiving is in response to a request to retrieve the segment of data, the comparing indicates that the expected geographic location matches the actual geographic location, and the method further comprises returning the segment of data.

19. The computer program product of claim 16, wherein the receiving is in response to a request to audit a location, the comparing indicates that the expected geographic location matches the actual geographic location, and the method further comprises returning the actual location.

20. The computer program product of claim 16, wherein the method further comprises storing a new data segment, the storing comprising:
   receiving a request to store the new segment of data at the actual geographic location of the storage device;
   creating a new location tag, the new location tag including the actual geographic location of the storage device;
   associating the new location tag to the new segment of data; and
   storing the new segment of data and the new location tag on the storage device.

* * * * *